United States Patent
Blom-Schieber

(10) Patent No.: US 11,628,632 B2
(45) Date of Patent: Apr. 18, 2023

(54) PRE-CONSOLIDATED CHARGES OF CHOPPED FIBER FOR COMPOSITE PART FABRICATION

(71) Applicant: The Boeing Company, Chicago, IL (US)

(72) Inventor: Adriana Willempje Blom-Schieber, Shoreline, WA (US)

(73) Assignee: The Boeing Company, Arlington, VA (US)

( * ) Notice: Subject to any disclaimer, the term of this patent is extended or adjusted under 35 U.S.C. 154(b) by 477 days.

(21) Appl. No.: 16/363,943

(22) Filed: Mar. 25, 2019

(65) Prior Publication Data

US 2020/0307028 A1    Oct. 1, 2020

(51) Int. Cl.
| | |
|---|---|
| *B29C 70/12* | (2006.01) |
| *B29C 70/46* | (2006.01) |
| *B29B 11/02* | (2006.01) |
| *B29B 11/12* | (2006.01) |
| *B29B 11/16* | (2006.01) |
| *B64F 5/10* | (2017.01) |
| *B29K 105/08* | (2006.01) |
| *B29K 105/12* | (2006.01) |
| *B29L 31/30* | (2006.01) |

(52) U.S. Cl.
CPC .............. *B29C 70/12* (2013.01); *B29B 11/02* (2013.01); *B29B 11/12* (2013.01); *B29B 11/16* (2013.01); *B29C 70/46* (2013.01); *B29C 70/465* (2013.01); *B29K 2105/0881* (2013.01); *B29K 2105/12* (2013.01); *B29L 2031/3076* (2013.01); *B64F 5/10* (2017.01)

(58) Field of Classification Search
CPC ..... B29C 70/502; B29C 70/465; B29C 70/46; B29C 70/345; B29C 70/545; B29B 11/02; B29B 11/12
See application file for complete search history.

(56) References Cited

U.S. PATENT DOCUMENTS

| | | | | |
|---|---|---|---|---|
| 2,949,054 A | * | 8/1960 | White | B29D 1/005 411/418 |
| 3,389,427 A | * | 6/1968 | Reyburn | B29B 11/12 425/347 |

(Continued)

FOREIGN PATENT DOCUMENTS

| | | | | |
|---|---|---|---|---|
| AU | 680804 B | * | 8/1997 | ............. B29C 35/02 |
| DE | 60105338 T2 | * | 9/2005 | ............... D04H 3/14 |

(Continued)

OTHER PUBLICATIONS

European Search Report; Application EP 20154048; dated Jul. 28, 2020.

(Continued)

*Primary Examiner* — Benjamin A Schiffman
(74) *Attorney, Agent, or Firm* — Yee & Associates, P.C.

(57) ABSTRACT

Systems and methods are provided for fabricating composite parts. One embodiment is a method for fabricating a composite part, the method comprising: reducing a bulk factor of chips of chopped fiber while forming the chips into a pre-consolidated charge; shaping portions of the pre-consolidated charge into shaped volumetric charges that fit within a die; and compression molding the shaped volumetric charges within the die.

20 Claims, 11 Drawing Sheets

(56) References Cited

U.S. PATENT DOCUMENTS

| | | | |
|---|---|---|---|
| 3,496,133 A | 2/1970 | Hoffman | |
| 4,414,011 A | 11/1983 | Layden et al. | |
| 4,950,532 A | 8/1990 | Das et al. | |
| 5,139,405 A * | 8/1992 | Krone | B29C 70/08 425/116 |
| 5,151,322 A * | 9/1992 | Kimoto | B29C 70/14 428/299.1 |
| 5,164,255 A * | 11/1992 | Weeks | B29B 11/16 428/298.1 |
| 5,569,424 A * | 10/1996 | Amour | B29B 17/0026 264/115 |
| 6,312,247 B1 * | 11/2001 | Kassuelke | B30B 5/02 425/389 |
| 6,924,021 B1 * | 8/2005 | Colegrove | B32B 5/12 428/131 |
| 7,102,112 B2 | 9/2006 | Anderson et al. | |
| 8,017,059 B2 | 9/2011 | Matsen et al. | |
| 8,329,280 B2 * | 12/2012 | Taketa | C03B 37/16 428/105 |
| 8,962,737 B2 * | 2/2015 | Pilpel | C08J 5/04 524/500 |
| 9,724,854 B2 * | 8/2017 | Boursier | B29B 11/16 |
| 2006/0125156 A1 | 6/2006 | Woolhouse | |
| 2006/0272278 A1 | 12/2006 | McMahan et al. | |
| 2007/0023975 A1 * | 2/2007 | Buckley | B29C 70/543 264/494 |
| 2007/0292669 A1 * | 12/2007 | Yamasaki | B29C 70/48 264/328.14 |
| 2010/0291388 A1 | 11/2010 | Alvarez et al. | |
| 2011/0064908 A1 * | 3/2011 | Kweder | B29C 70/345 428/113 |
| 2011/0111172 A1 * | 5/2011 | Gideon | B29C 70/86 428/138 |
| 2011/0301287 A1 | 12/2011 | Weyant et al. | |
| 2012/0141728 A1 * | 6/2012 | Ponsolle | B32B 5/022 428/131 |
| 2013/0189478 A1 * | 7/2013 | Fisher, Jr. | B29C 70/46 428/114 |
| 2015/0017390 A1 * | 1/2015 | Mine | B29C 70/541 428/156 |
| 2016/0346958 A1 * | 12/2016 | Steele | B29C 70/541 |
| 2020/0307126 A1 * | 10/2020 | Blom-Schieber | B29C 48/0011 |

FOREIGN PATENT DOCUMENTS

| | | | |
|---|---|---|---|
| EP | 0755762 A1 * | 1/1997 | B29C 43/361 |
| EP | 0916477 A1 * | 5/1999 | B29C 43/18 |
| JP | 2016078308 A | 5/2016 | |
| WO | WO-8909123 A1 * | 10/1989 | B29B 13/10 |

OTHER PUBLICATIONS

Aim Thermoplastics Video; youtube.com; Feb. 11, 2019.
Compression molding; Wikipedia; Feb. 4, 2019.
D. DeWayne Howell et al.; Compression Molding of Long Chopped Fiber Thermoplastic Composites; Fairfield, CA.
M.I. Abdul Rasheed; Compression molding of chopped woven thermoplastic composite flakes, A study of processing and performance; 2016.
Thermoplastics; Processes; https://www.aim-aerospace.com/processes; Feb. 11, 2019.

* cited by examiner

PRE-CONSOLIDATED CHARGES OF CHOPPED FIBER FOR COMPOSITE PART FABRICATION

FIELD

The disclosure relates to the field of composite materials, and in particular, to fabrication of composite parts.

BACKGROUND

"Chopped fiber" is a term that refers to small pieces of discontinuous fiber reinforced by thermoplastic resin. Each piece is relatively small (e.g., less than ten inches across) and includes segments of short fiber. When pieces of chopped fiber are heated to a melting temperature and subjected to pressure, thermoplastic between the pieces intermingles, resulting in a single composite part reinforced by randomly oriented short fibers.

Pieces of chopped fiber may be prepared by shredding scrap composite parts which would otherwise be discarded, or pieces may be cut to specific dimensions from unidirectional prepreg tapes. The resulting pieces of chopped fiber have a significant amount of bulk. That is, when pieces of chopped fiber are stacked into a die for molding, the pieces are separated by air gaps.

Therefore, it would be desirable to have a method and apparatus that take into account at least some of the issues discussed above, as well as other possible issues.

SUMMARY

Embodiments described herein utilize compression molding to fabricate solid charges of chopped fiber for placement into a die. The solid charges lack air gaps, and are shaped to fit in the dies in which they will be placed. Therefore, the solid charges occupy less space than loose pieces of chopped fiber, enabling the compression molding dies to be smaller. Additionally, the solid charges are not insulated by air gaps and will melt substantially more quickly than stacks of chopped fiber pieces.

One embodiment is a method for fabricating a composite part, the method comprising: reducing a bulk factor of chips of chopped fiber while forming the chips into a pre-consolidated charge; shaping portions of the pre-consolidated charge into shaped volumetric charges that fit within a die; and compression molding the shaped volumetric charges within the die.

A further embodiment is a non-transitory computer readable medium embodying programmed instructions which, when executed by a processor, are operable for performing a method for fabricating a composite part, the method comprising: reducing a bulk factor of chips of chopped fiber while forming the chips into a pre-consolidated charge; shaping portions of the pre-consolidated charge into shaped volumetric charges that fit within a die; and compression molding the shaped volumetric charges within the die.

A further embodiment is a system for fabricating composite parts. The system comprise a mold that pre-consolidates chips of chopped fiber, comprising discontinuous fibers and thermoplastic, into a pre-consolidated charge having a bulk factor between one and two, a female compression molding die having a receptacle that defines a shape for a composite part, a male compression molding die having a protrusion that is complementary to the receptacle, and a shaped volumetric charge of pre-consolidated chopped fiber, fabricated from a pre-consolidated charge, that is disposed within the receptacle flush against at least one wall of the receptacle.

A still further embodiment is an apparatus for facilitating fabrication of composite parts. The apparatus comprises a mold comprising: multiple walls; and a recess surrounded by the walls that receives chips of chopped fiber, comprising discontinuous fibers and thermoplastic. The apparatus also includes a press that that is dimensioned to be complementary to the mold.

Yet another embodiment is an article of manufacture comprising: a volumetric shaped charge comprising: discontinuous fibers and thermoplastic melted from chips of chopped fiber, shaped to lie flush against walls of a receptacle of a compression molding die.

Other illustrative embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

DESCRIPTION

The figures and the following description provide specific illustrative embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Figure 1:
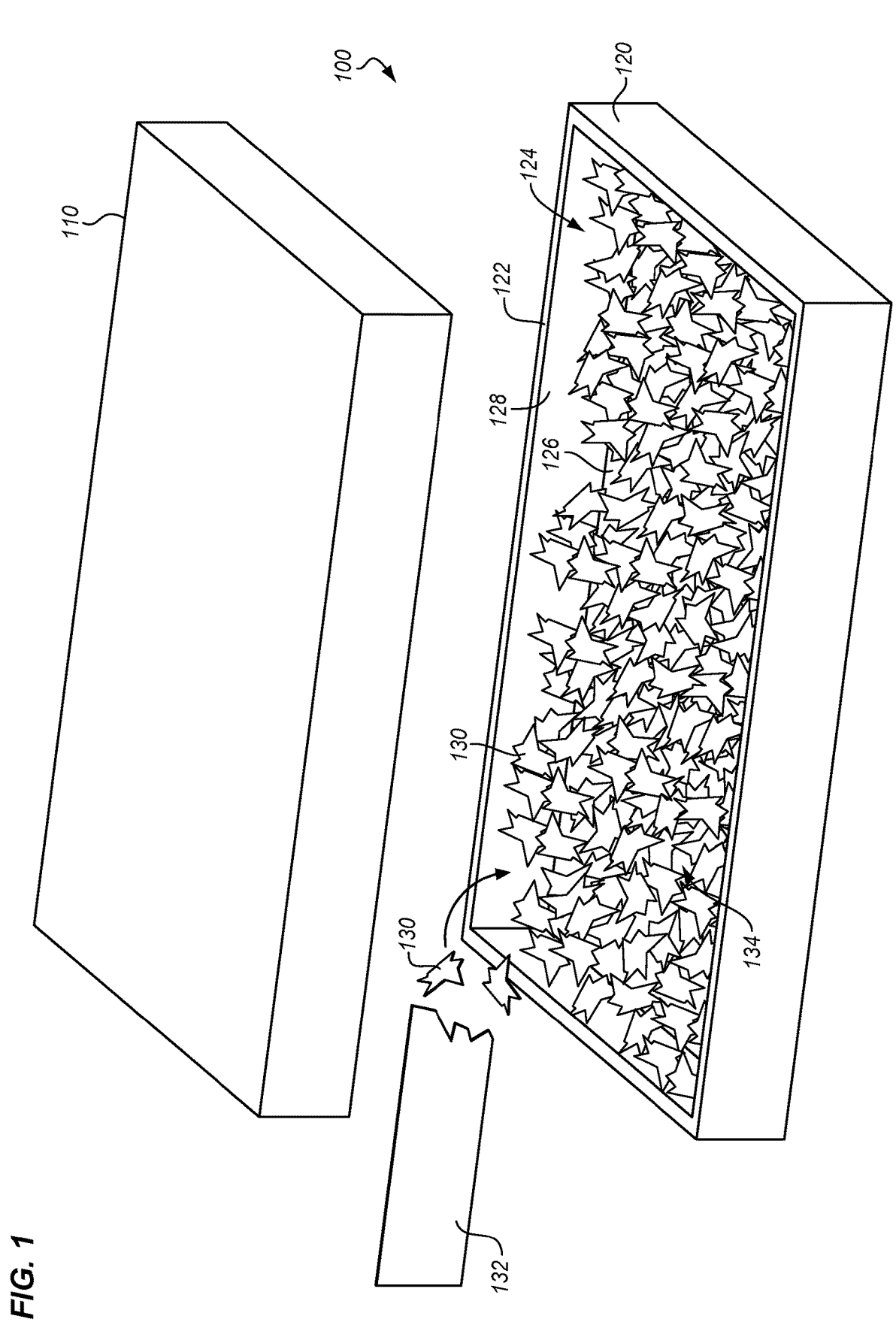
FIG. 1 is a diagram of a molding apparatus for fabricating a pre-consolidated charge of chopped fiber in an illustrative embodiment.

FIG. 1 is a diagram of a molding apparatus 100 for fabricating a pre-consolidated charge of chopped fiber (comprising thermoplastic resin and fibers) in an illustrative embodiment. Molding apparatus 100 includes mold 120 and press 110. Mold 120 includes walls 128 having lip 122 and base 126, which together define recess 124 in which chips 130 of chopped fiber are disposed. Chips 130 may be acquired by shredding (e.g., cutting small solid pieces off of) a component 132 (e.g., a composite part), or by fabricating pre-cut pieces from component 132 (e.g., pre-preg unidirectional tapes). In such an embodiment, chips 130 of chopped fiber therefore comprise portions of a shredded composite part (i.e., component 132).

Chips 130 may therefore comprise flat flakes, rough volumetric pieces, etc. Press 110 is dimensioned to be complementary to mold 120, and is driven into recess 124 at high pressure and temperature in order to fabricate a pre-consolidated charge. Chips 130 may exhibit a substantial bulk factor (e.g., between five and ten) when stacked within recess 124. As used herein, "bulk factor" refers to the ratio of the volume of chips of chopped fiber to the volume of an equal weight of the chips of chopped fiber after consolidation into a voidless solid. Hence, the majority of space within recess 124 may comprise air gaps 134, which insulate the chips 130 from heat. This may increase the time needed to melt thermoplastic within the chips by a substantial amount (e.g., ninety minutes or more, even when pressure is applied). However, after the pre-consolidated charge has been consolidated, it may be used for compression molding parts. As the pre-consolidated charge has no air gaps, it heats much faster (e.g., ten times faster or more) than loose chips. When molding apparatus 100 is operated to generate pre-consolidated charges for a large volume of chips 130 (e.g., a volume twice or more than the amount of chopped fiber needed to fill a die for compression molding), the overall amount of time consumed in the fabrication process is reduced. Specifically, performing a single insulation-delayed heating process at molding apparatus 100 followed by multiple accelerated heating processes in a compression molding system is substantially faster than performing multiple insulation-delayed heating processes in a compression molding system.

Illustrative details of the operation of molding apparatus 100 will be discussed with regard to FIGS. 2A-2B. Assume, for this embodiment, that molding apparatus 100 is empty and currently awaits loading in order to fabricate a pre-consolidated charge of chopped fiber. Thermoplastic within the chopped fiber may comprise polyether ether ketone (PEEK), polyaryletherketone (PAEK), polyphenylene sulfide (PPS), nylon, etc.

Figure 2A:
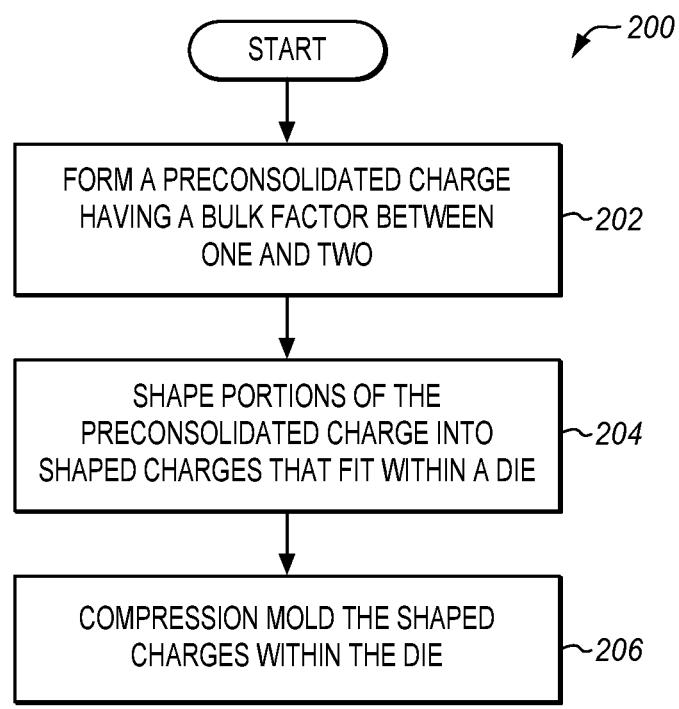
FIGS. 2A-2B are flowcharts illustrating a method for creating pre-consolidated charges of chopped fiber and using them to fabricate composite parts in an illustrative embodiment.

FIG. 2A is a flowchart illustrating a method 200 for creating pre-consolidated charges of chopped fiber and using them to fabricate composite parts in an illustrative embodiment. While FIG. 2A provides a broad overview of the method, FIG. 2B provides an additional and detailed description of steps within that method.

The steps of method 200 are described with reference to molding apparatus 100 of FIG. 1, but those skilled in the art will appreciate that method 200 may be performed in other systems. The steps of the flowcharts described herein are not all inclusive and may include other steps not shown. The steps described herein may also be performed in an alternative order.

In step 202, a pre-consolidated charge is formed, having a bulk factor between one and two (e.g., a bulk factor between one point one, and one). The pre-consolidated charge may be formed by heating and pressing loose chips of chopped fiber together within molding apparatus 100 as described above. For example, in one embodiment the entirety of the molding apparatus 100 and the chips 130 of chopped fiber are heated up in an oven until the thermoplastic is molten, and then transferred into a press, pressed and cooled down. In a further embodiment, mold 120 and press 110 are heated in place, thermoplastic in the chips becomes molten through indirect heat from the mold 120, and the press 110 is closed. In a further embodiment, mold 120 is heated and an IR convection element (not shown) is placed above the mold 120 to melt thermoplastic in the chips 130, then the mold 120 is moved to press 110, the heater is shuttled out of the press, and the press is closed. The chips of chopped fiber and/or molding apparatus 100 may be preheated prior to loading adding the chips, if desired.

After the pre-consolidated charge has been formed, it may further be inspected to ensure that no foreign bodies are present within it. For example, the pre-consolidated charge may be inspected via ultrasonic or visual techniques.

Figure 5:
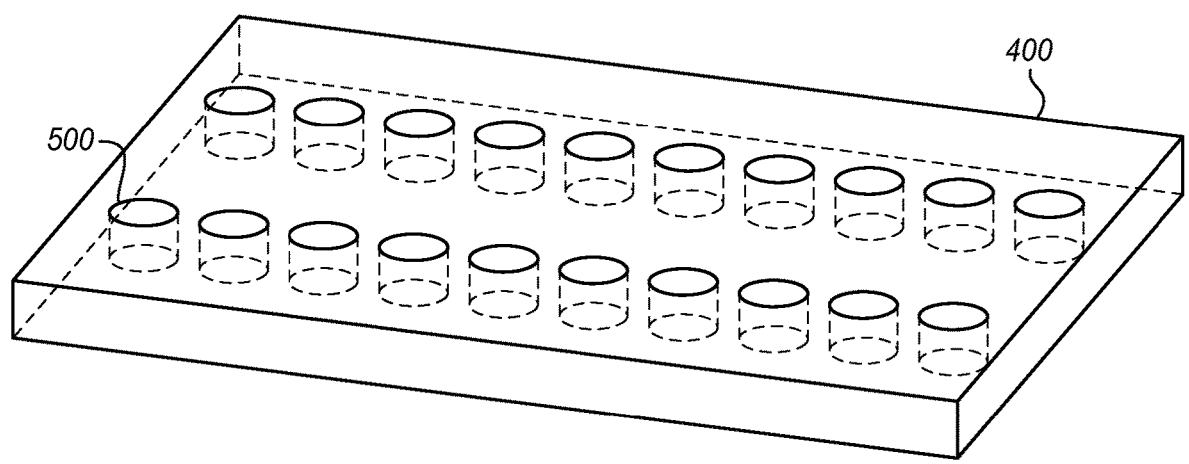
FIGS. 5-6 illustrate shaping of a pre-consolidated charge into desired shapes in an illustrative embodiment.
Figure 6:
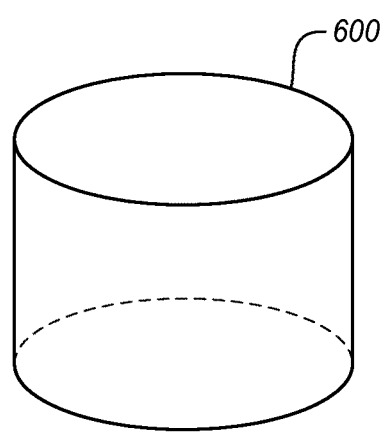

In step 204, portions of the pre-consolidated charge are shaped into shaped volumetric charges that fit within a female compression molding die. The shaping process may comprise stamping or cutting multiple pieces from the pre-consolidated charge, each piece designed to fit within a receptacle of a female compression molding die. For example, as shown in FIGS. 5-6, portions 500 of pre-consolidated charge 400 may be trimmed, stamped, or otherwise shaped into multiple shaped volumetric charges 600. Each shaped volumetric charge 600 has a volume equal to a volume of a composite part that will be made from it.

In step 206, the shaped volumetric charges are compression molded within the female compression molding die. For example, this may comprise driving a male compression molding die into the female compression molding die. The driving is performed while the shaped volumetric charges are disposed in recesses of the female compression molding die. Furthermore, the driving is performed at compression molding pressures and temperatures (discussed above).

Figure 2B:
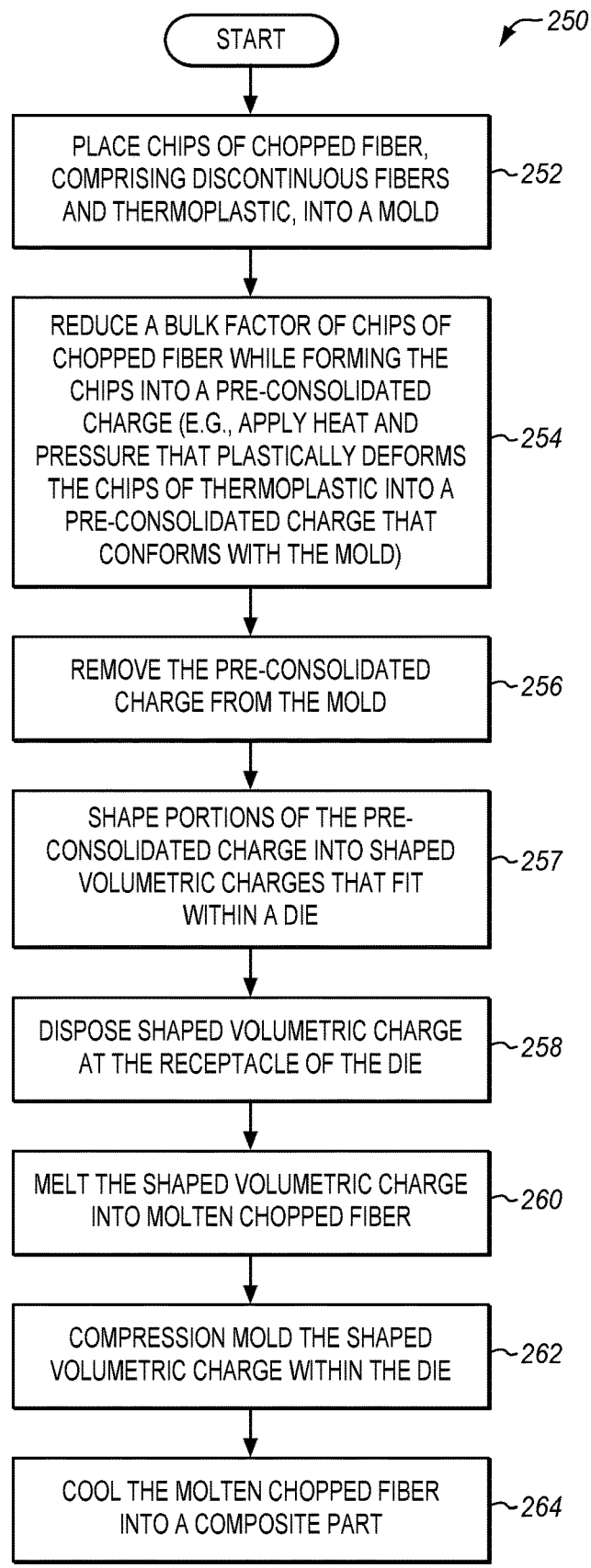

Method 250 of FIG. 2B provides details describing various steps recited in FIG. 2. In step 252, chips 130 of chopped fiber, comprising discontinuous fibers (e.g., fiberglass, carbon fiber) and thermoplastic are placed at mold 120. Thermoplastic within the chopped fiber may comprise polyether ether ketone (PEEK), polyaryletherketone (PAEK), polyphenylene sulfide (PPS), nylon, etc. Step 252 may comprise pouring a predetermined mass of chips 130 into mold 120. The act of placement may be performed, for example, by an automated dispenser or robot arm (not shown).

Figure 3:
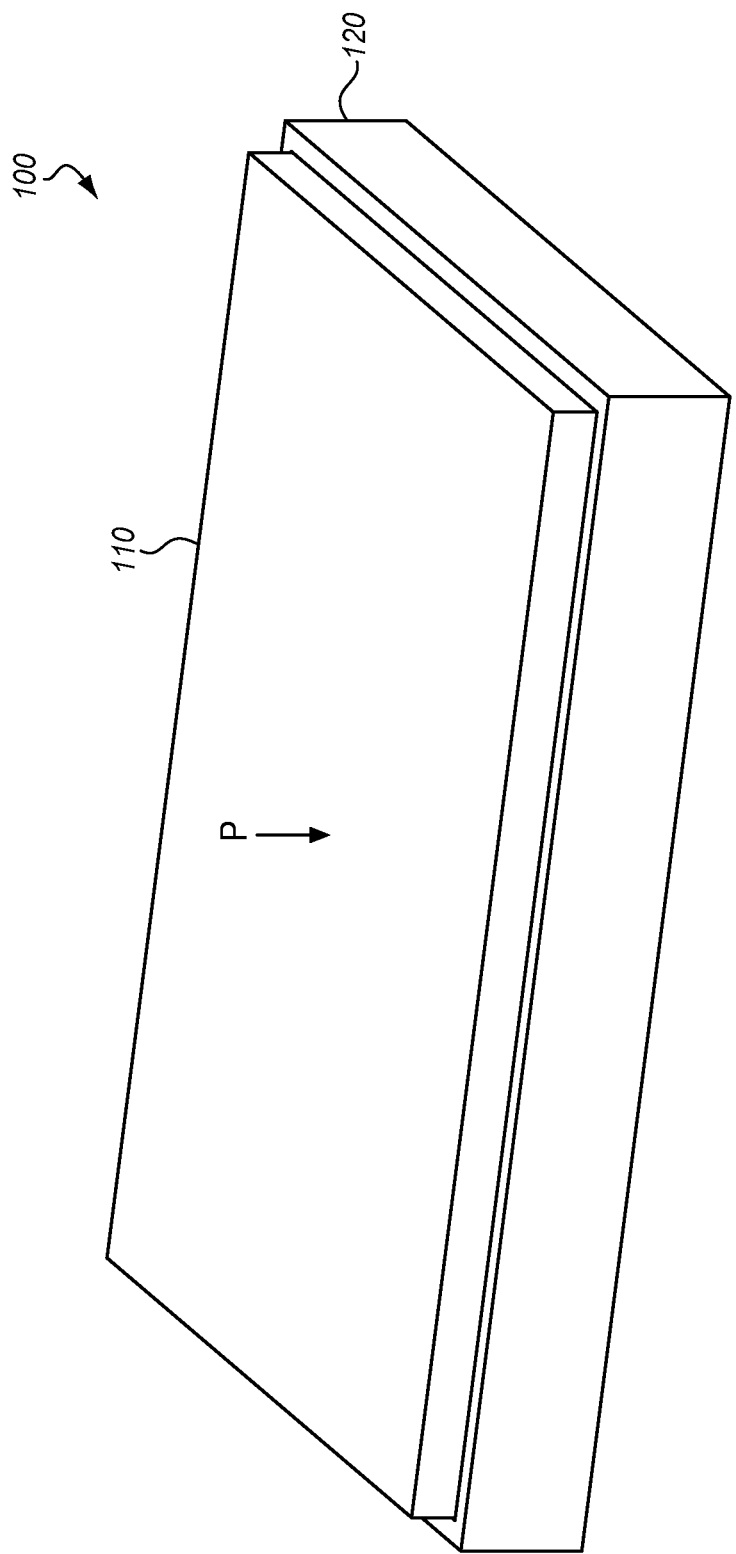
FIGS. 3-4 are diagrams illustrating pressure formation of pre-consolidated charges in an illustrative embodiment.
Figure 4:
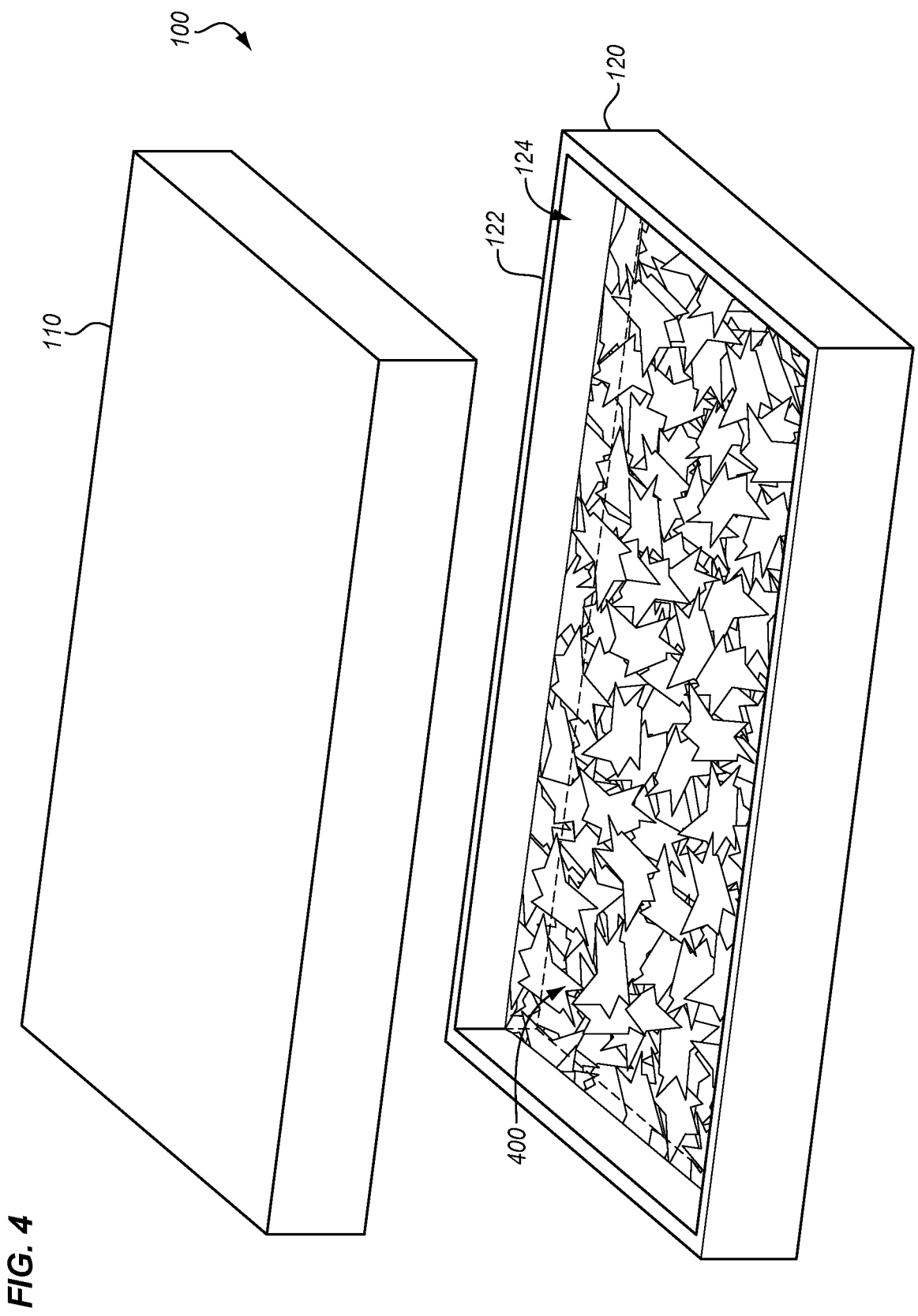

In step 254, a bulk factor of chips of chopped fiber is reduced, while forming the chips into a pre-consolidated charge. For example, heat may be applied, and then press 110 may be activated. Press 110 applies compaction pressure P (e.g., between twenty and five hundred pounds per square inch of pressure) and heat (e.g., at a temperature above a melting point of the thermoplastic and below a degradation temperature of the thermoplastic, such as between six hundred and eight hundred degrees Fahrenheit) to recess 124, as shown in FIG. 3. In one embodiment reducing the bulk factor comprises applying between twenty and five thousand pounds per square inch of pressure to the chips of chopped fiber. Although chips 130 are insulated by air gaps, over time the chips 130 are melted into a single mass of chopped fiber. When solidified, the mass forms a pre-consolidated charge having a bulk factor of less than two (e.g., a bulk factor of one, corresponding with no air pockets, or a bulk factor of one point one, corresponding with few air pockets). FIG. 4 illustrates a pre-consolidated charge 400 residing within recess 124 after molding has completed. Thus, application of heat and pressure plastically deforms the chips of thermoplastic into a pre-consolidated charge that conforms with the mold.

In step 256, the pre-consolidated charge 400 is removed from mold 120. In step 257, portions 500 of the pre-consolidated charge are formed into shaped volumetric charges that fit within receptacles of a compression molding die. The shaped volumetric charges have the same mass as a final composite part that they will be compression molded to form. The shaping process may comprise stamping or cutting multiple pieces from the pre-consolidated charge, each piece designed to fit within a die. For example, as shown in FIGS. 5-6, pre-consolidated charge 400 may be trimmed, stamped, or otherwise shaped for multiple shaped volumetric charges 600. Each shaped volumetric charge 600 has a mass equal to a mass of a composite part that will be made from it.

Greater benefits in fabrication speed are achieved as the number of shaped volumetric charges 600 formed from a pre-consolidated charge 400 increases. That is, when enough shaped volumetric charges 600 exist to facilitate multiple runs of compression molding at a compression molding die, the overall amount of time spent melting the chips 130 during fabrication decreases.

Figure 7:
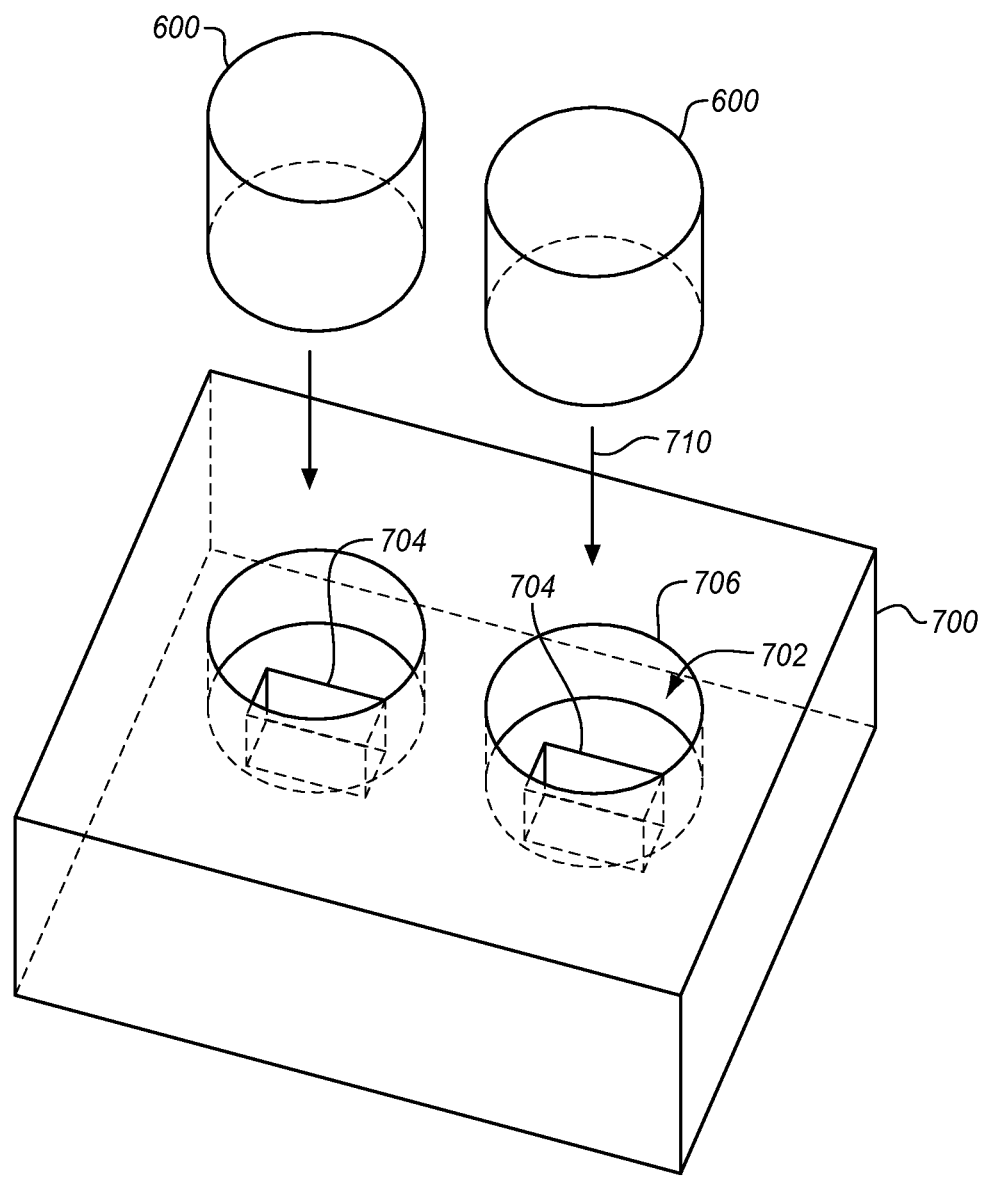
FIG. 7 illustrates insertion of shaped volumetric charges into a compression molding die in an illustrative embodiment.
Figure 8:
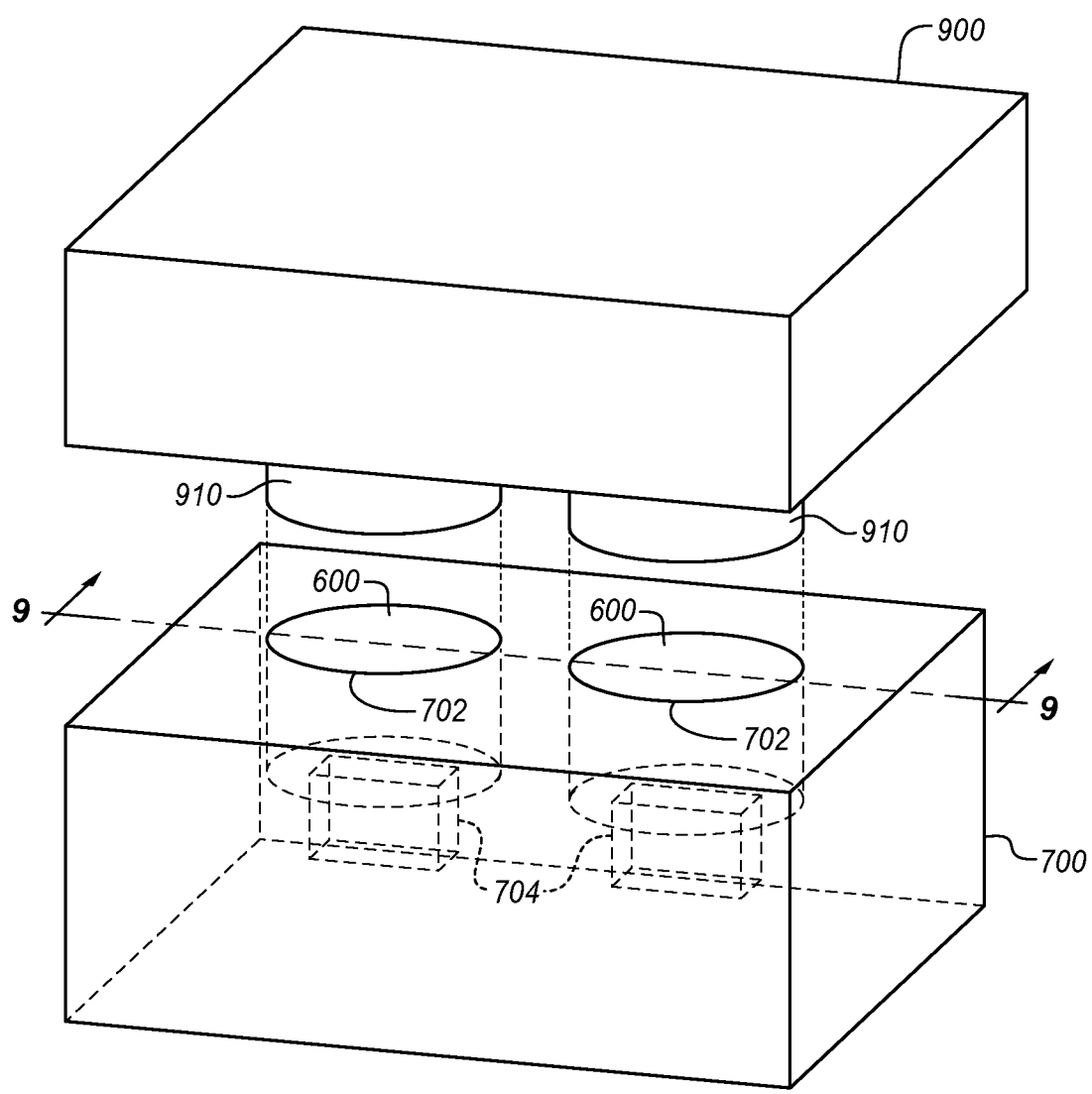
FIGS. 8-9 depict shaped volumetric charges disposed at a compression molding die in an illustrative embodiment.

In step 258, the shaped volumetric charge 600 is disposed at the receptacle of the die that it was made to conform with. As used herein, a shaped volumetric charge 600 that "fits within" the receptacle need not perfectly fill the entire volume of the receptacle, as compression molding will cause the shaped volumetric charge to accomplish this result. Instead, a shaped volumetric charge is considered to fit within a receptacle if it does not protrude from the receptacle when placed therein. In further embodiments, the shaped volumetric charge lies flush against one or more walls of the receptacle. In still further embodiments, the shaped volumetric charge 600 fits precisely within the receptacle, but the receptacle is later altered in shape during the compression molding process, or the final shape of the resulting composite part is defined at least in part by the male die. This arrangement increases conductive heating of the shaped volumetric charge during compression molding. FIG. 7 illustrates placement of shaped volumetric charges 600 into receptacles 702 of a female die 700 for compression molding. Receptacles 702 include shafts 704, which are shaped in accordance with a desired form for a resulting composite part. For example, shafts 704 may facilitate insertion of the resulting composite part into another composite part. Shafts 704 may also be used to house an extraction pin or piston (not shown) that facilitates pushing the resulting composite part out after it has hardened. In this embodiment, the shaped volumetric charges are moved in direction 710, and lie flush against walls 706. Hence, shaped volumetric charges 600 are placed within a disc-shaped portion of receptacle 702, but do not enter shafts 704 of receptacles 702. FIG. 8 illustrates the shaped volumetric charges 600 inserted into receptacles 702.

In step 260, the shaped volumetric charge 600 is melted into molten chopped fiber via the application of heat. Because the shaped volumetric charge 600 has no air gaps, it is not insulated from heating. This means that conductive heat transfer (e.g., from female die 700) and radiative heat transfer (e.g., from an infrared lamp or other heating element) applies heat directly to thermoplastic within the shaped volumetric charge, decreasing the amount of time to melt by a factor of ten to one, or even more. Hence, cycle time for the female die 700 is reduced, and composite parts may be fabricated more rapidly. Still further, the size of female die 700 may be reduced when compared to other female dies that utilize chips of chopped fiber, because the receptacles of female die 700 are dimensioned to accommodate a low bulk factor (e.g., between one and two), while other female dies would have to accommodate a high bulk factor (e.g., between five and seven).

Figure 9:
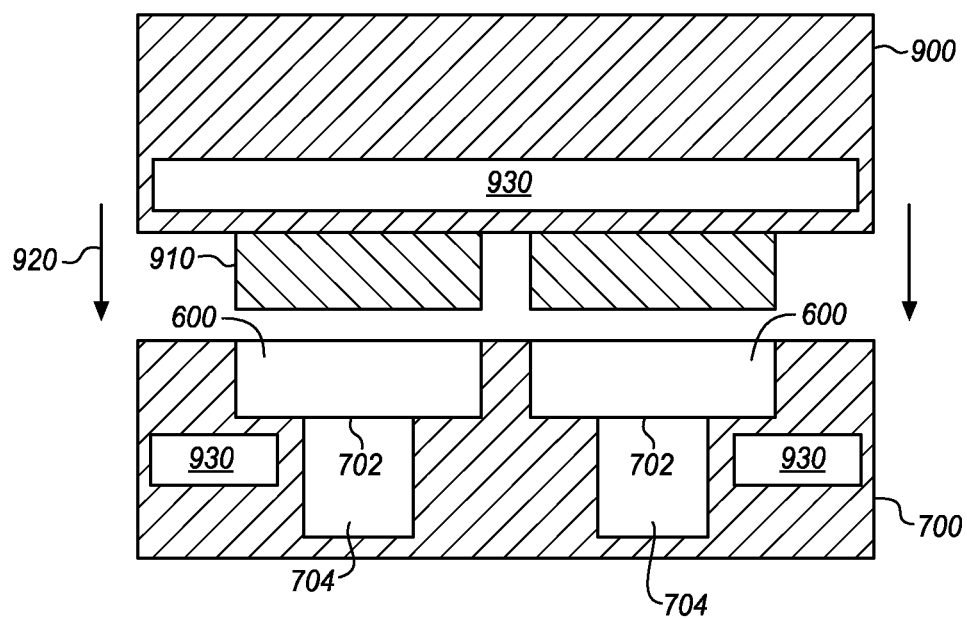

In step 262, the molten chopped fiber is compression molded into a shape defined by the receptacle. Because molten chopped fiber has a low viscosity, and because the shape of the receptacle may be complex, the molten chopped fiber will not flow entirely into the receptacle without the application of pressure and heat. The amount of pressure applied during molding may depend on the geometry and the distance over which the chopped fiber flows. That is, more complex geometries and larger flow distances may require higher pressure and/or pressure. The amount of pressure used during this compression molding process may be between twenty and five thousand pounds per square inch of pressure, and the temperature may be greater than a melting temperature of the thermoplastic within the chopped fiber, yet lower than a degradation temperature of the thermoplastic. FIG. 9 (which corresponds with view arrows 9 of FIG. 8) provides an example wherein a male die 900 having protrusions 910 is pressed in direction 920 against shaped volumetric charges 600 while they are molten, in order to drive molten thermoplastic into shafts 704. In this embodiment, the dies include integral heaters 930, which facilitate heating during the compression molding process to prevent the thermoplastic from consolidating/hardening before the entire die cavity is filled.

In step 264, the molten chopped fiber is cooled into a composite part. The cooling process may be performed passively, or actively by drawing a cooling fluid (e.g., air, water) through female die 700. After the composite part has been formed, it may be removed and female die 700 may be reloaded with more shaped volumetric charges made from pre-consolidated charge 400.

Methods 200 and 250 provide a technical benefit over prior systems and techniques, because it prevents time-consuming operations related to melting chips of chopped fiber from having to be performed every time compression molding occurs. Instead, a large pre-consolidated charge may be fabricated which provides material for many iterations of compression molding. This reduces the overall amount of time spent melting chips of chopped fiber, which increases production speed. Additionally, because the bulk factor of the shaped volumetric charges is substantially lower than the bulk factor of chips of chopped fiber, receptacles used in a female compression molding die do not need to be created with a volume large enough to accommodate a stack of chopped fiber pieces. This reduces the size of the dies used for compression molding, which reduces the thermal mass of the dies. This feature therefore results in a technical benefit of reduced heating requirements and faster cycle times.

The two-step chopped-fiber compression molding process may also provide a quality benefit over a traditional one-step chopped-fiber compression molding process. Fiber distribution in the pre-consolidated charge according to this new technique may be more consistent due to the simple geometry and relatively little flow that takes place during its manufacturing, whereas loose chopped fiber chips may fall into a cavity of a female die and assume different orientations. More consistent input in a process typically results in more consistent output, thereby reducing the variability between different part instances made with the same process and resulting in higher quality.

Unlike injection molding, which is a single-step process, the compression molding techniques described herein are a two-step process wherein filling and pressing are performed separately. Utilizing compression molding instead of injection molding provides a technical benefit in the form of reduced pressure requirements, reduced tooling complexity, and enhanced structural properties because it can accommodate larger reinforcement elements (i.e. short fibers).

EXAMPLES

In the following examples, additional processes, systems, and methods are described in the context of a compression molding system for chopped fiber composite parts.

Figure 10:
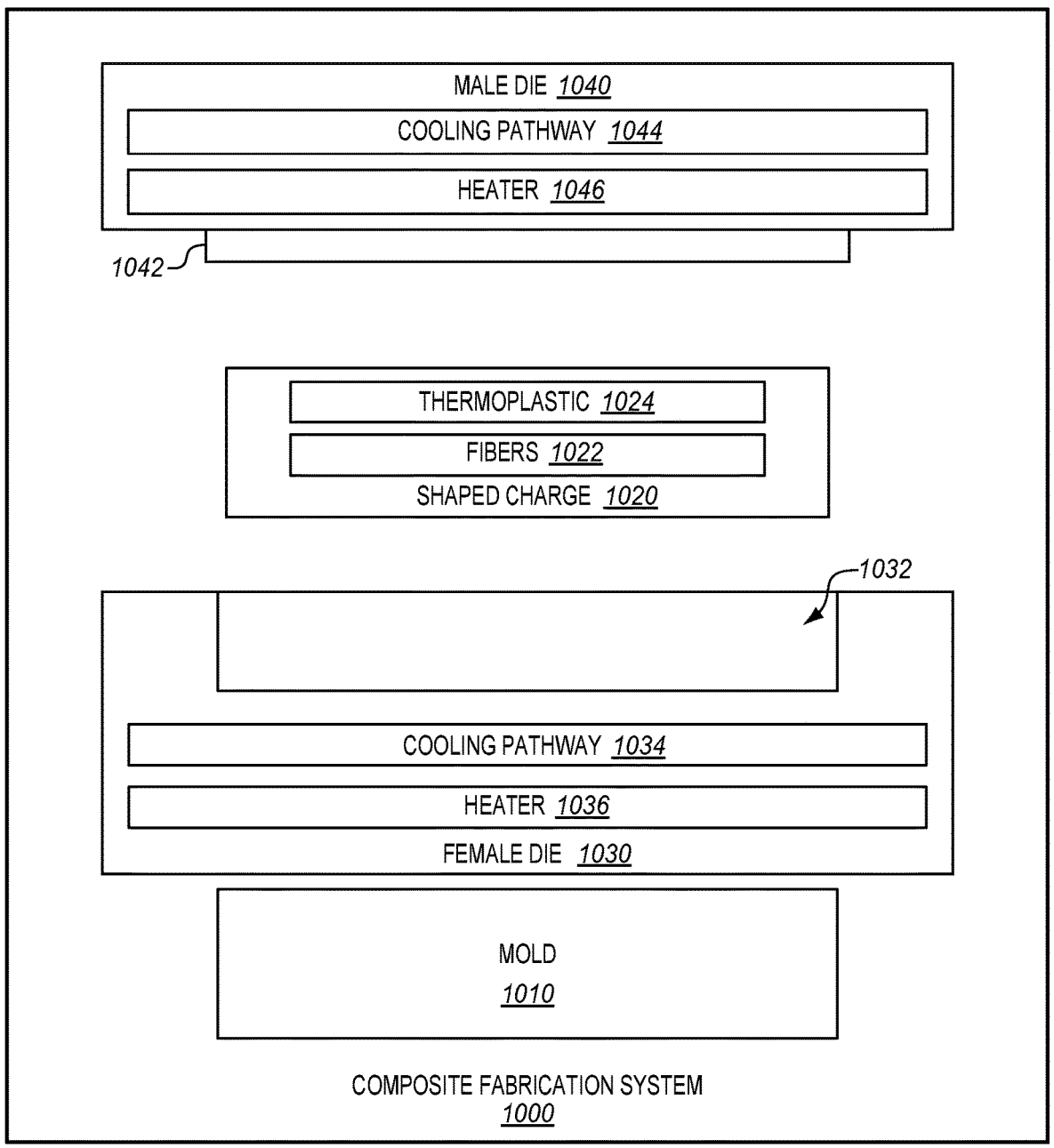
FIG. 10 is a block diagram of composite fabrication system in an illustrative embodiment.

FIG. 10 is a block diagram of a composite fabrication system 1000 in an illustrative embodiment. Composite fabrication system 1000 includes a mold 1010 from which a pre-consolidated charge of chopped fiber is fabricated. Composite fabrication system 1000 further includes shaped volumetric charge 1020, which is made from thermoplastic 1024 and randomly oriented fibers 1022, which reinforce the thermoplastic 1024. Shaped volumetric charge 1020 is placed flush against receptacle 1032 of female die 1030, and is compression molded into a composite part by driving a protrusion 1042 (e.g., a protrusion intended for applying compression molding forces) of male die 1040 into receptacle 1032. Heating during compression molding is achieved via heater 1036 and heater 1046, which are integral with the dies. The heaters may comprise resistive heating elements, ferromagnetic susceptors heated through induction, smart susceptors heated through induction, or other heating technologies. After a desired shape has been formed, the dies are cooled by drawing a cooling fluid (e.g., air, water) through cooling pathway 1044 and cooling pathway 1034 of the dies.

Figure 11:
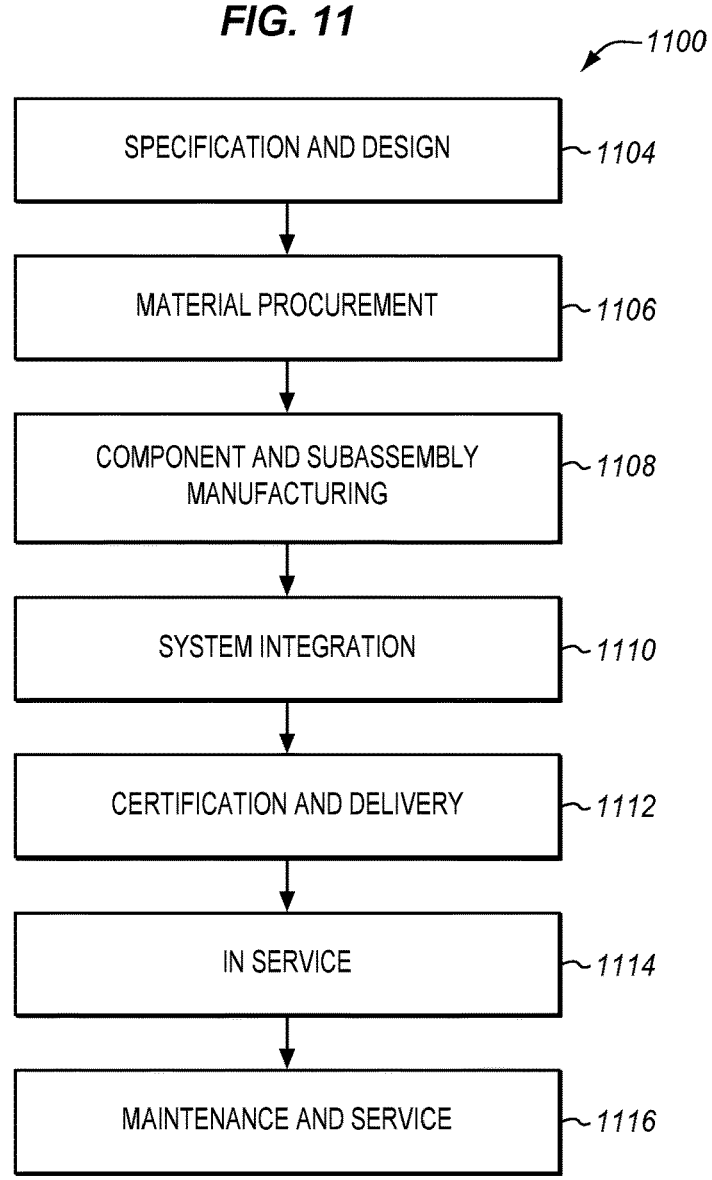
FIG. 11 is a flow diagram of aircraft production and service methodology in an illustrative embodiment.
Figure 12:
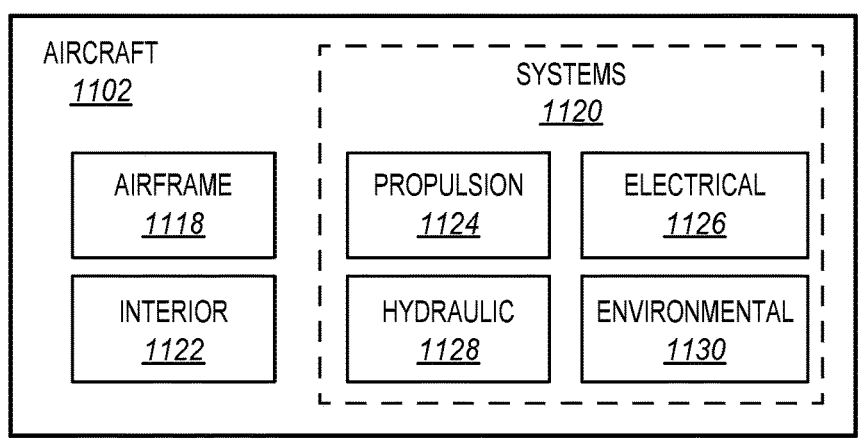
FIG. 12 is a block diagram of an aircraft in an illustrative embodiment.

Referring more particularly to the drawings, embodiments of the disclosure may be described in the context of aircraft manufacturing and service in method 1100 as shown in FIG. 11 and an aircraft 1102 as shown in FIG. 12. During pre-production, method 1100 may include specification and design 1104 of the aircraft 1102 and material procurement 1106. During production, component and subassembly manufacturing 1108 and system integration 1110 of the aircraft 1102 takes place. Thereafter, the aircraft 1102 may go through certification and delivery 1112 in order to be placed in service 1114. While in service by a customer, the aircraft 1102 is scheduled for routine work in maintenance and service 1116 (which may also include modification, reconfiguration, refurbishment, and so on). Apparatus and methods embodied herein may be employed during any one or more suitable stages of the production and service described in method 1100 (e.g., specification and design 1104, material procurement 1106, component and subassembly manufacturing 1108, system integration 1110, certification and delivery 1112, service 1114, maintenance and service 1116) and/or any suitable component of aircraft 1102 (e.g., airframe 1118, systems 1120, interior 1122, propulsion system 1124, electrical system 1126, hydraulic system 1128, environmental 1130).

Each of the processes of method 1100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 12, the aircraft 1102 produced by method 1100 may include an airframe 1118 with a plurality of systems 1120 and an interior 1122. Examples of systems 1120 include one or more of a propulsion system 1124, an electrical system 1126, a hydraulic system 1128, and an environmental system 1130. Any number of other systems may be included. Although an aerospace example is shown, the principles of the invention may be applied to other industries, such as the automotive industry.

As already mentioned above, apparatus and methods embodied herein may be employed during any one or more of the stages of the production and service described in method 1100. For example, components or subassemblies corresponding to component and subassembly manufacturing 1108 may be fabricated or manufactured in a manner similar to components or subassemblies produced while the aircraft 1102 is in service. Also, one or more apparatus embodiments, method embodiments, or a combination thereof may be utilized during the subassembly manufacturing 1108 and system integration 1110, for example, by substantially expediting assembly of or reducing the cost of an aircraft 1102. Similarly, one or more of apparatus embodiments, method embodiments, or a combination thereof may be utilized while the aircraft 1102 is in service, for example and without limitation during the maintenance and service 1116. For example, the techniques and systems described herein may be used for material procurement 1106, component and subassembly manufacturing 1108, system integration 1110, service 1114, and/or maintenance and service 1116, and/or may be used for airframe 1118 and/or interior 1122. These techniques and systems may even be utilized for systems 1120, including, for example, propulsion system 1124, electrical system 1126, hydraulic 1128, and/or environmental system 1130.

In one embodiment, a part comprises a portion of airframe 1118, and is manufactured during component and subassembly manufacturing 1108. The part may then be assembled into an aircraft in system integration 1110, and then be utilized in service 1114 until wear renders the part unusable. Then, in maintenance and service 1116, the part may be discarded and replaced with a newly manufactured part. Inventive components and methods may be utilized throughout component and subassembly manufacturing 1108 in order to manufacture new parts.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

What is claimed is:

1. A method for fabricating a composite part, the method comprising:
reducing a bulk factor of chips comprising chopped fiber while heating, to a temperature between six hundred and eight hundred degrees Fahrenheit, and forming the chips into a pre-consolidated charge;
separating portions from the pre-consolidated charge;
placing a portion of the portions into a receptacle within a die, wherein the portion has a mass equal to the composite part;
melting the portion within the receptacle and flowing the chopped fiber within the receptacle within the die; and
compression molding the portion into the composite part.

2. The method of claim 1 wherein:
the pre-consolidated charge has a bulk factor between one and two.

3. The method of claim 1 wherein:
reducing the bulk factor comprises placing the chips comprising chopped fiber into a mold.

4. The method of claim 3 wherein:
reducing the bulk factor further comprises applying heat and pressure that plastically deforms the chips into the pre-consolidated charge that conforms with the mold.

5. The method of claim 4 wherein:
reducing the bulk factor further comprises removing the pre-consolidated charge from the mold.

6. The method of claim 1 wherein:
compression molding comprises disposing each of the portions at a corresponding receptacle of the die.

7. The method of claim 6 wherein:
disposing the each of the portions at a corresponding receptacle comprises placing the each of the portions flush against walls of a corresponding receptacle.

8. The method of claim 6 wherein:
compression molding further comprises melting the portions into molten chopped fiber comprising discontinuous fibers and thermoplastic.

9. The method of claim 8 wherein:
The portions each comprise a volume equal to a volume of a composite part that they will be compression molded to form.

10. The method of claim 8 further comprising:
compression molding the molten chopped fiber into shapes defined by corresponding receptacles; and
cooling the molten chopped fiber into composite parts.

11. The method of claim 1 further comprising:
placing a shaped volumetric charge flush against at least one wall of the die.

12. The method of claim 1 wherein:
the reducing the bulk factor is performed at a pressure between twenty and five hundred pounds per square inch.

13. The method of claim 1 wherein:
the chips comprise a thermoplastic; and
the reducing the bulk factor is performed at a temperature above a melting point of the thermoplastic and below a degradation temperature of the thermoplastic.

14. The method of claim 1 wherein:
the separating comprises stamping.

15. The method of claim 1 wherein:
the separating comprises trimming.

16. The method of claim 1 wherein:
the portion does not protrude from the receptacle within the die.

17. The method of claim 1 wherein:
the chips comprise a thermoplastic; and
the compression molding is performed at a temperature above a melting point of the thermoplastic and below a degradation temperature of the thermoplastic.

18. The method of claim 1 wherein:
the compression molding is performed at a pressure between twenty and five thousand pounds per square inch.

19. A method of fabricating a portion of an aircraft, the method comprising:
reducing a bulk factor of chips comprising chopped fiber while heating, to a temperature between six hundred and eight hundred degrees Fahrenheit, and forming the chips into a pre-consolidated charge;
separating shaped volumetric charges from the pre-consolidated charge;
placing a shaped volumetric charge of the shaped volumetric charges into a receptacle within a die, wherein the shaped volumetric charge has a mass equal to the portion of the aircraft;
melting the shaped volumetric charge within the receptacle and flowing the chopped fiber within the receptacle within the die; and
compression molding the shaped volumetric charge into the portion of the aircraft.

20. A non-transitory computer readable medium embodying programmed instructions controlling, when executed by a processor, a method for fabricating a composite part, the method comprising:
reducing a bulk factor of chips comprising chopped fiber while heating, to a temperature between six hundred and eight hundred degrees Fahrenheit, and forming the chips into a pre-consolidated charge;
separating portions from the pre-consolidated charge;
placing a portion of the portions into a receptacle within a die, wherein the portion has a mass equal to the composite part;
melting the portion within the receptacle and flowing the chopped fiber within the receptacle within the die; and
compression molding the portion into the composite part.

* * * * *